Feb. 5, 1929.

L. T. WILCOX 1,700,755

STOVE

Filed Aug. 17, 1927

INVENTOR.
LEWIS T. WILCOX.
BY
ATTORNEYS.

Feb. 5, 1929. 1,700,755
L. T. WILCOX
STOVE
Filed Aug. 17, 1927 2 Sheets-Sheet 2
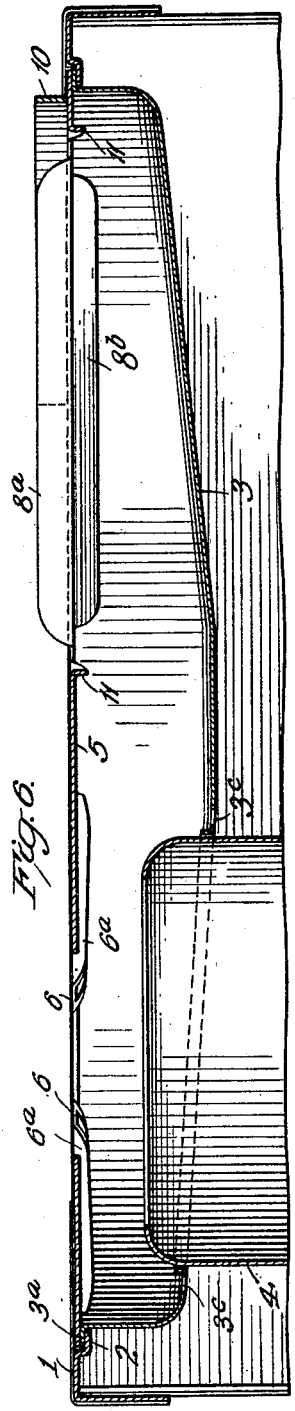
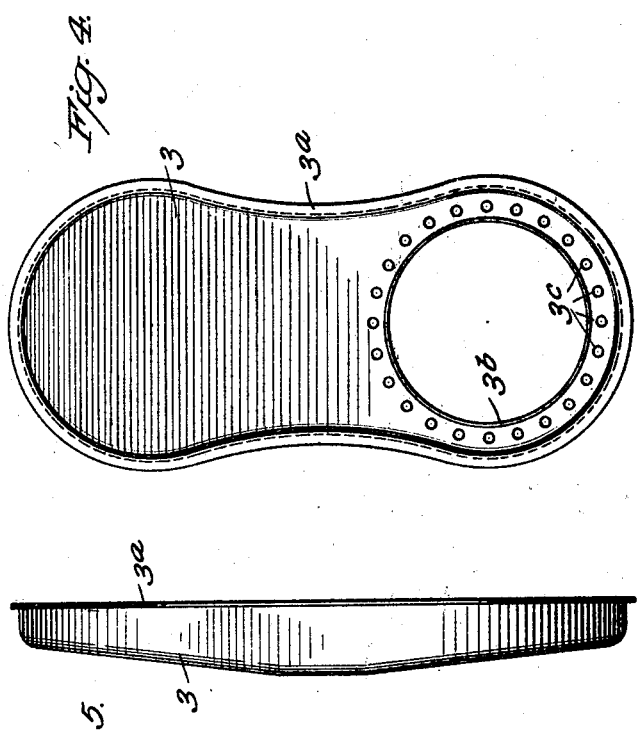
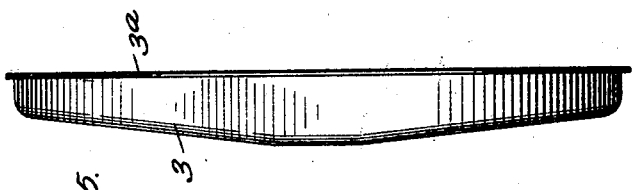
INVENTOR.
LEWIS T. WILCOX.
BY
ATTORNEYS.

Patented Feb. 5, 1929.

1,700,755

UNITED STATES PATENT OFFICE.

LEWIS T. WILCOX, OF PEEKSKILL, NEW YORK.

STOVE.

Application filed August 17, 1927. Serial No. 213,476.

My invention relates to stoves, particularly cooking stoves, and has an especial utility in such stoves of the burner type, as gas or oil stoves.

Specifically my invention relates to the construction of a stove top which enables a single burner to serve two cooking holes. I have disclosed in my pending application Serial No. 169,446, issued as Patent No. 1,649,007, a device for this purpose known as a heat collector, which is an elongated tray or pan-like article so associated with the under side of the stove top as to connect two adjacent cooking holes and form a passage within which the hot gases from the burner are collected and conducted from heating relation with a utensil on the first hole to heating relation with a utensil on the second hole. The gases enter the collector through an opening underneath the first hole and a special grate which cooperates with the collector to cause the gases to heat the second utensil efficiently is disclosed in my pending application Serial No. 169,444, issued as Patent No. 1,649,006.

This invention in one of its aspects has reference to the connection between the stove top and the heat collector. In another aspect it has reference to an improved grate construction which is adapted to cooperate with the other features of my invention to make an efficient and economical heating construction which constitutes an improvement upon the combination for the purpose as set forth and claimed in my copending application Serial No. 170,756.

In the stove top construction to which my invention is applied, the two cooking holes which are joined by the heat collector are connected so as to form an elongated continuous opening which includes the two holes and the space between the two, the middle portion between the round ends being ordinarily somewhat restricted in width as compared to the diameter of the cooking holes. The margin about the opening is shouldered to form a grate ledge so that the grate will sit in flush with the stove top. The heat collecting pan conforms to the shape of the elongated opening and is removably supported from the grate ledge, being desirably provided with an outward flange and resting thereby upon the grate ledge.

A characteristic of my invention is the fact that the heat collector and the grates both rest on the ledge surrounding the elongated opening in the stove top.

The grates may be in one or more pieces but they may economically be drawn from sheet metal in one piece and baffle vanes be formed for the rear grate by bending one side of the strips forming the grate bars up and the other side down. An arcuate rear baffle wall may be added as a separate piece. Obviously a one piece grate member may also be cast in this form.

Other details of my invention will appear from the following description. I shall now describe the illustrated embodiments of my invention and shall thereafter point out my invention in claims.

Fig. 4 is a detail in plan of the heat collector;

Fig. 5 is a side elevation of the same;

Fig. 6 is an enlarged longitudinal section on line 6—6 of Figure 1.

Figure 1:
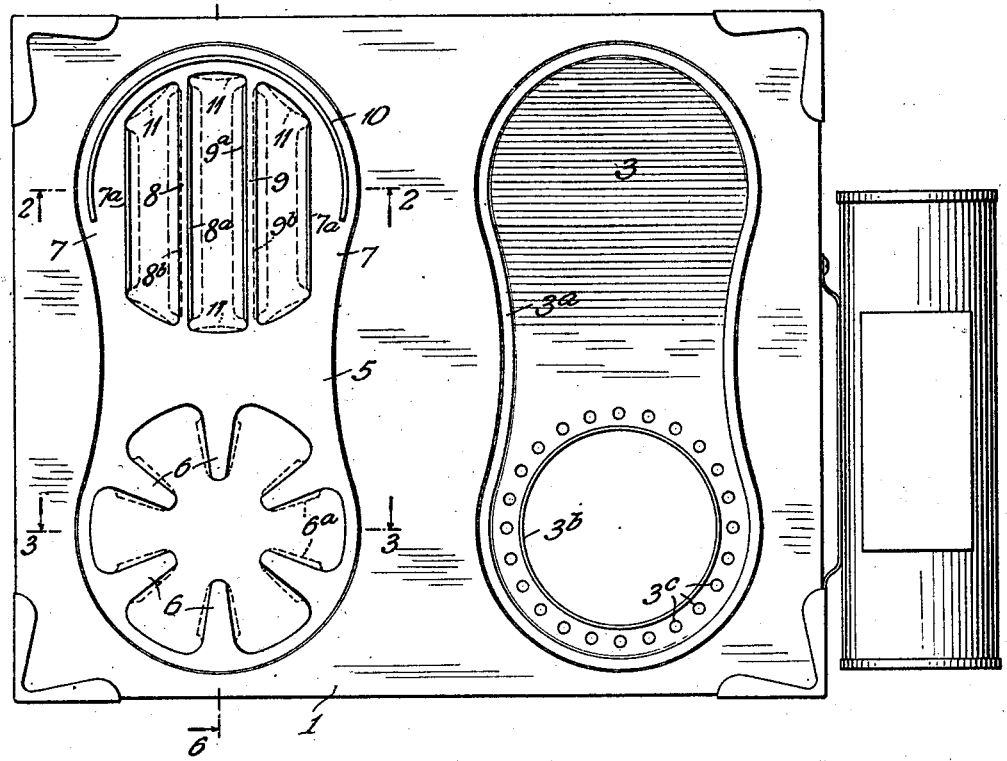
Fig. 1 is a plan of a stove embodying my invention, the grate member being removed from one opening.
Figure 2:
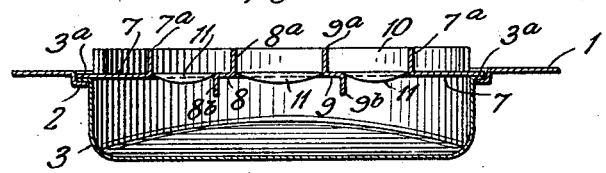
Fig. 2 is a transverse section of the same on line 2—2.

In the embodiment shown in Figures 1 to 6, the stove top 1 is a sheet metal member and includes four cooking holes. These are coupled in two pairs, the front hole of each pair being secured with a source of heat. The metal of the top between the two holes of each pair is removed in each instance. In other words the top is provided with two elongated continuous openings each including a front and rear hole, the middle portions of the openings being somewhat restricted in width, the opening thus approximating the shape of a figure 8.

The entire stove top in this construction is in one piece. The margin above each elongated opening is depressed to form a grate ledge 2. In this particular construction the heat collector 3 is a separate, removable member resting upon the grate ledge 2. This heat collector is drawn from sheet metal and is a comparatively shallow pan or tray of the same outline as the elongated holes in the stove top 1. Around its upper edge it is provided with an outwardly turned flange 3ª which rests upon the ledge 2 when the heat collector is dropped into its opening in the stove top. In the form shown it is deepest in the middle where its width is most restricted and the bottom slopes up toward each end. A round hole 3$^b$ in the bottom of one end has an upturned flange within which fits the chimney 4 of the burner. Around the opening 3$^b$ the bottom is provided with a series of small holes 3$^c$ which constitute air inlets.

A suitable grate is provided in each cooking hole to support the cooking utensil over the hole. The grate for the first hole, i. e. the one immediately over the burner will be flush with the stove top so that the heat will not escape around the vessel on that hole. The grate for the remote hole will be raised above the plane of the stove top so as to induce a draft and bring the hot gases into efficient contact with the bottom of the vessel on that hole, as explained in my said copending application Serial No. 169,444.

In the illustrated construction a one piece grate member 5 is provided which, in this instance, is formed of sheet metal. This is of the same shape as the elongated openings in the stove top and rests upon the flange 3$^a$ of the heat collector, the ledge 2 being depressed just enough to bring the grate top flush with the stove top.

Figure 3:
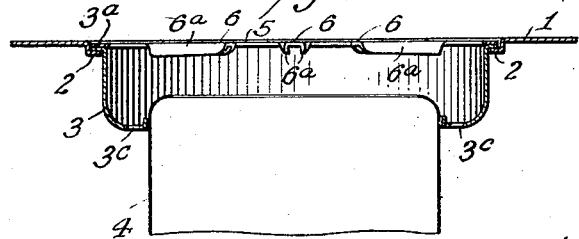
Fig. 3 is a transverse section of the same on line 3—3.

To form the grate for the first hole, i. e. the one over the burner, the metal is cut out in circular outline but with inwardly extending radial fingers 6 left to constitute the grate bars. These grate bars for the first hole are therefore flush with the stove top. They are strengthened by having their lateral edges turned down to form depending flanges 6$^a$ (Fig. 3). The metal which is left to form these flanges in cutting out the blank is indicated by the dotted lines in Fig. 1.

The grate opening for the rear hole is also of generally circular outline except that segmental portions 7 are left at each side. The inner edges of these segmental portions are severed at their ends in cutting out the blank and these edges are turned up to form raised grate bars 7$^a$ extending from front to rear. Between the two grate bars 7$^a$ there are left in cutting out the blank two intermediate grate bars 8 and 9 extending from front to rear which have their inner edges 8$^a$ and 9$^a$ turned up to the height of the flanges 7$^a$ and which have their outer edges 8$^b$ and 9$^b$ turned down for substantially the same distance. Around the back of the grate is an upstanding arcuate baffle 10 which, in the form shown, is a separate sheet metal strip which is secured around the outer edge of the grate member by means of spaced prongs which project through holes in the grate and are turned over against the underside.

The flanges 8$^a$, 8$^b$, and 9$^a$, 9$^b$ serve as vanes to keep the heat evenly distributed while the imperforate side segments 7 direct the heat toward the middle of the vessel. The rear baffle wall 10 causes the flow of hot gases to reverse and thus pass in an efficient heat transferring relation to the bottom of the vessel. In stamping out the grate from sheet metal, I prefer also to leave curved projections 11 as indicated in dotted lines in Fig. 1, between each grate bar at both the front and rear of the grate openings, and these are turned down in the finished grate as appears in Figs. 2 and 6 and serve both to strengthen the metal at the edge of the opening and also as baffles to aid in directing the current of heated gases properly through the grate.

It is obvious that a single complete stove may be constructed embodying any number of pairs of cooking holes and that the grate members may be made in two or three sections if so desired and that various other changes may be made in the details of structure without departing from the spirit and scope of my invention.

I claim:

1. In a stove, the combination of a stove top part embracing two cooking holes therein and having a shouldered flange about the opening forming a depressed grate ledge with a heat collector supported below said stove top part said heat collector being a sheet metal elongated pan shaped member with rounded ends and a restricted middle portion the bottom at one end being provided with a relatively large burner opening surrounded by a plurality of small openings and the bottom at the other end being imperforate both bottoms sloping up from the restricted middle portion said heat collector having its upper edge flanged outwardly to engage on said depressed ledge.

2. In a stove, the combination of a top part for the stove having a continuous opening therein comprising two connected cooking holes and having a shouldered flange about the opening forming a depressed grate ledge, a removable pan shaped heat collector underneath the top part connecting the two cooking holes said pan having outwardly extending flange adapted to rest on said grate ledge and a one piece grate member extending over said opening in said stove top part and resting on said grate ledge said grate member having a grate opening formed on each end with the grate bars in one grate opening flush and radially disposed with depending lateral flanges, and with the grate bars extending from front to rear across the other grate opening and extending as baffle vanes thereacross.

3. In a stove, the combination of a stove top part having an elongated opening therein including two cooking holes, and a one-piece grate member shaped to fit said opening and having a grate opening formed in each end with the grate bars in one grate opening flush and radially disposed with depending lateral flanges, and with grate bars extending from front to rear across the other grate opening and extending as baffle vanes both above and below the plane of the grate.

4. In a stove, the combination of a stove top part having an elongated opening therein including two cooking holes, and a one-piece grate member shaped to fit said opening and having a grate opening formed in each end, one grate opening being circular with flush grate bars extending radially inwardly and having depending lateral flanges, and the other grate opening having imperforate side portions and grate bars extending thereacross from front to rear and extending as baffle vanes both above and below the plane of the grate and having on its upper side an arcuate baffle wall extending around its rear portion and the same height as the vanes.

5. In a stove, the combination of a stove top part having an elongated opening therein including two cooking holes, and a one-piece grate member for the two cooking holes fitting into said opening and formed of sheet metal and having a grate opening in each end, the grate at one end having inwardly extending fingers forming grate bars with downwardly turned lateral flanges and the grate at the other end having its sides imperforate and integral strips extending across the open center from front to rear as grate bars with one side of each strip turned down and the other side up, thereby forming baffle vanes.

6. In a stove the combination of a stove top part having an elongated opening therein including two cooking holes, and a one-piece grate member for the two cooking holes fitting into said opening and formed of sheet metal and having a grate opening in each end, the grate at one end having inwardly extending fingers forming grate bars with downwardly turned lateral flanges and the grate at the other end having its sides imperforate and integral strips extending across the open center from front to rear as grate bars with one side of each strip turned down and the other side up, thereby forming baffle vanes, the imperforate segments closing the sides having their inner edges turned up to the height of the vanes and parallel thereto, and an arcuate strip upstanding around the rear of the latter grate opening of the height of the vanes and forming a rear baffle.

In witness whereof, I hereunto subscribe my signature.

LEWIS T. WILCOX.